US010257100B2

(12) United States Patent
Zhang et al.

(10) Patent No.: US 10,257,100 B2
(45) Date of Patent: Apr. 9, 2019

(54) ENABLING RESILIENT MICROGRID THROUGH ULTRA-FAST PROGRAMMABLE NETWORK

(71) Applicant: University of Connecticut, Farmington, CT (US)

(72) Inventors: Peng Zhang, Storrs Mansfield, CT (US); Bing Wang, Storrs Mansfield, CT (US); Peter B. Luh, Storrs Mansfield, CT (US); Lingyu Ren, Storrs Mansfield, CT (US); Yanyuan Qin, Storrs Mansfield, CT (US)

(73) Assignee: University of Conneticut, Farmington, CT (US)

( * ) Notice: Subject to any disclaimer, the term of this patent is extended or adjusted under 35 U.S.C. 154(b) by 0 days.

(21) Appl. No.: 15/581,601

(22) Filed: Apr. 28, 2017

(65) Prior Publication Data

US 2017/0324671 A1 Nov. 9, 2017

Related U.S. Application Data

(60) Provisional application No. 62/331,722, filed on May 4, 2016.

(51) Int. Cl.
*H04L 12/825* (2013.01)
*H04L 12/891* (2013.01)
(Continued)

(52) U.S. Cl.
CPC .......... *H04L 47/25* (2013.01); *H02J 13/0086* (2013.01); *H04L 45/121* (2013.01);
(Continued)

(58) Field of Classification Search
CPC ....... H04L 47/25; H04L 45/121; H04L 45/28; H04L 45/42; H04L 45/64; H04L 47/24;
(Continued)

(56) References Cited

U.S. PATENT DOCUMENTS

2014/0371941 A1 12/2014 Keller et al.
2015/0054830 A1\* 2/2015 Inuzuka ................ H02J 13/001
                                                   345/440
(Continued)

FOREIGN PATENT DOCUMENTS

WO    WO 2016/128210    8/2016

OTHER PUBLICATIONS

Cahn et al., Software-Defined Energy Communication Networks: From Substation Automation to Future Smart Grids, IEEE Smart Grid Communications—Smart Grid Services and Management Models, pp. 558-563, 2013.
(Continued)

*Primary Examiner* — Kibrom T Hailu
(74) *Attorney, Agent, or Firm* — McCarter & English, LLP (57) ABSTRACT

Systems and methods for integrating ultra-fast programmable networks in microgrid are disclosed to provide flexible and easy-to-manage communication solutions, thus enabling resilient microgrid operations in face of various cyber and physical disturbances. The system is configured to establish a novel software-defined networking (SDN) based communication architecture which abstracts the network infrastructure from the upper-level applications to significantly expedite the development of microgrid applications, develop three functions of the SDN controller for microgrid emergency operations, including time delay guarantee, failover reconfiguration and rate limit and create a hardware-in-the-loop cyber-physical platform for evaluating and validating the performance of the presented architecture and control techniques.

17 Claims, 9 Drawing Sheets

(51) Int. Cl.
  H04L 12/851 (2013.01)
  H04L 12/727 (2013.01)
  H04L 12/715 (2013.01)
  H04L 12/703 (2013.01)
  H04L 12/717 (2013.01)
  H02J 13/00 (2006.01)
  H04L 12/26 (2006.01)

(52) U.S. Cl.
  CPC .............. H04L 45/28 (2013.01); H04L 45/42 (2013.01); H04L 45/64 (2013.01); H04L 47/24 (2013.01); H04L 47/41 (2013.01); *H04L 43/08* (2013.01)

(58) Field of Classification Search
  CPC ......... H04L 47/41; H04L 43/08; H04L 45/02; H04L 45/26; H04L 45/586; H04L 45/44; H04L 45/124; H04L 49/25; H04J 13/0086
  See application file for complete search history.

(56) References Cited

U.S. PATENT DOCUMENTS

| | | | | |
|---|---|---|---|---|
| 2015/0094871 A1* | 4/2015 | Bhageria | .................. | H02J 3/00 700/297 |
| 2015/0163288 A1 | 6/2015 | Maes et al. | | |
| 2016/0253046 A1* | 9/2016 | Garrison | ............... | G06F 11/328 715/736 |
| 2016/0285640 A1* | 9/2016 | Kapur | ..................... | H04L 12/10 |
| 2017/0085501 A1* | 3/2017 | Utgikar | ..................... | H04L 49/25 |
| 2017/0093732 A1* | 3/2017 | Akhavain Mohammadi | ............... | H04L 45/74 |

OTHER PUBLICATIONS

Sydney, et al., Using GENI for experimental evaluation of Software Defined Networking in Smart Grids, Computer Networks, 63, 5-16, 2014.
Kim et al., Virtualized and Self-Configurable Utility Communications Enabled by Software-Defined Networks, IEEE International Conference on Smart Grid Communications, pp. 416-421, 2014.
Dong, et al., Software-Defined Networking for Smart Grid Resilience: Opportunities and Challenges, the $1^{st}$ Cyber-Physical System Security Workshop (CPSS), Apr. 14-17, 2015, Singapore.
Maharjan, et al., Providing Microgrid Resilience During Emergencies Using Distributed Energy Resources (Conference Paper), 2015 IEEE Globecom Worshops, GC Workshops 2015—Proceedings, Article No. 7414031, Feb. 18, 2016, 4 pages.
Hannon, et al., DSSnet: A Smart Grid Modeling Platform Combining Electrical Power Distribution System Simulation and Software Defined Networking Emulation, SIGSIM-PADS '16, pp. 131-142, May 15-18, 2016, Banff, AB, Canada.
U.S. Appl. No. 62/332,233, filed May 5, 2016.

* cited by examiner

ENABLING RESILIENT MICROGRID THROUGH ULTRA-FAST PROGRAMMABLE NETWORK

CROSS-REFERENCE TO RELATED PATENT APPLICATIONS

This application claims priority to U.S. Provisional Application No. 62/331,722 entitled "Enabling Resilient Microgrid Through Ultra-Fast Programmable Network, which was filed on May 4, 2016, the entire content of which is hereby incorporated by reference herein.

STATEMENT OF GOVERNMENT INTEREST

This invention was made with Government support under CNS1419076 awarded by the National Science Foundation. The government has certain rights in the invention.

FIELD OF THE DISCLOSURE

The present disclosure relates to a communication solution for microgrid applications. In particular, the present disclosure relates to microgrid communication for critical infrastructure or large vendors who are in need of resilient power supply.

BACKGROUND OF THE DISCLOSURE

Presently, over 90% of power outages occur along electric distribution systems. Microgrid is an emerging and promising paradigm for enhancing distribution system resilience. A microgrid is a small-scale, localized distribution network designed to supply electrical and heatload of a local community (e.g., a military base, a high-tech park, or a university campus). It typically includes distributed generators, load, storage and protection devices that are regulated by a microgrid central controller. Thus, it is desirable to design microgrids with high penetration of renewable energy sources.

On the other hand, for such microgrids, unintentional islanding, also referred to as emergency operation, is particularly challenging. This is because renewable energy sources have much smaller inertia than traditional energy generation sources and are intermittent and uncertain. As a result, it is important to achieve fast emergency control to guarantee a smooth transition from grid connection mode to islanding mode. Otherwise, the system may lose balance between load and generation, and may eventually collapse. Fast emergency control of a microgrid relies on the communication infrastructure.

To guarantee microgrid stability, the communication infrastructure needs to provide reliable and low-latency data transmission, as well as react quickly to dynamic network conditions (e.g., link failure, network congestion). Furthermore, it needs to satisfy the diverse quality of service (QoS) requirements of different types of data being transmitted over the communication network, some being small and periodic control data with delay requirement in milliseconds, while some being large energy management data that can tolerate minutes latencies. Industrial control networks, such as field bus, do not meet the above requirements, and hence are not suitable for microgrids.

These and other needs are effectively addressed by the systems and methods of the present disclosure.

SUMMARY OF THE DISCLOSURE

Embodiments of the present disclosure include systems and methods for ultra-fast programmable networks in microgrid to provide flexible and easy-to-manage communication solutions, thus enabling resilient microgrid operations. Exemplary embodiments of the disclosed system are configured to establish software-defined networking (SDN) based communication architecture, develop three functions of the SDN controller for microgrid emergency operations, including time delay guarantee, failover reconfiguration and rate limit, and create a hardware-in-the-loop (HIL) cyber-physical platform for evaluating performance of the presented architecture.

In exemplary embodiments, the system is configured to enable communication in a highly-resilient microgrid using an ultra-fast programmable networking technology. The disclosed system generally includes a microgrid communication architecture including an application layer communicatively coupled with a control layer. The disclosed application layer is configured to execute an application programmed to manage microgrid emergency control.

The control layer is communicatively coupled with an infrastructure layer, and is configured to provide logical control of a flow of data in the microgrid upon execution of the application programmed to manage microgrid emergency control.

The infrastructure layer includes a plurality of network switches and a plurality of links connecting the network switches. The infrastructure layer is configured to transmit the flow of data in between the plurality of network switches.

In exemplary embodiments, the ultra-fast programmable network technology is SDN and communications are transmitted and received between the layers using an Application Program Interface (API).

The application layer executes the application configured to manage the microgrid emergency upon detection of an emergency. Upon execution, the application controls the flow of data. The emergency may be one of a short circuit, trouble spot caused by a weather event, or nuisance tripping of a circuit breaker.

In some embodiments, the application controls the flow of data by dynamically routing the flow of data on a path between a source and a destination. The application ensures the flow of data reaches the destination on a delay less than or equal to a predetermined amount of time.

In some embodiments, the application controls the flow of data by dynamically diverting the flow of data from a first path to a second path.

In some embodiments, the application controls the flow of data using a plurality of meters and a plurality of queues, wherein at least one meter is assigned to data packets within the flow of data and is configured to measure and control the rate of the at least the data packets and push the data packets into at least one queue based on the rate of the at least one of the data packets.

Exemplary embodiments include a Hardware-In-The-Loop system configured to execute communication in a Software Defined Networking (SDN)-based architecture for a microgrid. The Hardware-In-The-Loop system includes a real-time simulator where a microgrid is emulated including a plurality of energy sources and loads. The real-time simulator is configured to exchange data with a microgrid central controller through a communication network including a plurality of network switches. The system also includes an SDN controller configured to execute an application upon the dynamic control of the data flow.

Any combination or permutation of embodiments is envisioned. Additional advantageous features, functions and applications of the disclosed assemblies, systems and methods of the present disclosure will be apparent from the description which follows, particularly when read in conjunction with the appended figures. The references, publications and patents listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIGS. 5A-B show dynamics of the distribution system from 20 s to 40 s; specifically.

FIGS. 7A-B shows system response (voltage magnitude of the PCC bus and microgrid, control signal for DG 1); specifically.

DETAILED DESCRIPTION OF THE DISCLOSURE

The exemplary embodiments disclosed herein are illustrative of ultra-fast programmable networks in microgrid to provide flexible and easy-to-manage communication solutions, thus enabling resilient microgrid operations. Therefore, details disclosed herein with reference to exemplary systems/assemblies and associated processes/techniques of assembly and use are not to be interpreted as limiting, but merely as the basis for teaching one skilled in the art how to make and use the advantageous assemblies, systems and methods of the present disclosure.

The present disclosure provides a system to enable a highly-resilient microgrid using ultra-fast programmable networking technologies, particularly Software Defined Networking (SDN). The architecture of SDN can separate the control plane and data plane. It provides real-time programmability, allowing a communication network to detect and react to failures and congestions at run time. It also provides flexible functions to support diverse QoS requirements. In addition, it adopts open protocols in network switches and supervisory controllers, and hence makes it much easier to develop new applications and enable fast innovation in microgrid.

The exemplary embodiments disclosed herein present an SDN-based communication architecture for microgrid is presented to enhance microgrid resilience. This architecture has two salient features: First, the control layer is independent of the hardware infrastructures, which enables rapid implementation of diverse applications. Second, the SDN controller serves as a monitor supervising the entire status of the network switches as well as a controller solving network problems, such as data congestion, port down, and bandwidth allocation. In this regard, the communication network is capable of providing reliable and customized service for microgrid. Three functions of SDN controller are developed based on the communication requirements of microgrid, including latency-guaranteed communication, failover recovery and QoS support. They are designed to ensure the timeliness of control signal and critical measurements, restore automatically from network failure and allocate communication resources based on urgency levels of various microgrid data, respectively. Utilizing HIL demonstrates the capability of the SDN architecture in providing fast speed and high reliability data communication and in stabilizing microgrid. The SDN technologies can be implemented to provide for scalable microgrids deployments and enhanced power system resiliency and efficiency.

In general the disclosure provides a system configured to:
Establish innovative SDN-based communication architecture for microgrid. This architecture embeds intelligence in networks (i.e., making communication network fully programmable) and abstracts the network infrastructure from the upper-level applications (e.g., various control and coordination functionalities) to significantly simplify application development. Such a software-defined architecture (the so-called physically distributed and logically centralized) provides ultimate control of information flow in microgrids such that various QoS requirements in microgrid operations can be satisfied and a truly plug-and-play, scalable communication and control platform can be realized.

Develop three customized SDN-based techniques to meet the challenges in microgrid emergency control. Specifically, these techniques provide time delay guarantee, automatic failure recovery, and communication speed control. The novelty of the time delay guarantee algorithm lies in the capability of dynamic round trip time detection as well as online time delay reduction via data rerouting. The other two functions entail new developments by leveraging the latest SDN featured OpenFlow protocol. In combination, they provide fast and reliable communication support to quickly achieve stability during microgrid emergency operation.

Build a hardware-in-the-loop (HIL) environment which combines the high fidelity dynamic models for microgrid (running in a real-time simulator) and hardware SDN facilities (SDN-capable switches and an SDN controller). It is an important step in constructing a realistic environment for evaluating the feasibility and effectiveness of using SDN in microgrid. The performance evaluation demonstrates that with SDN the microgrid resilience is highly enhanced.

SDN can be used in several applications including data centers, wide area networks, university/enterprise networks, and home networks. SDN can be used in smart grid, e.g., demand response, SCADA (Supervisory Control and Data Acquisition), substation automation, and PMU (Phasor Measurement Unit) networks. Furthermore, SDN can be integrated with microgrids, as will be discussed herein.

SDN-Based Communication Architecture

Figure 1:
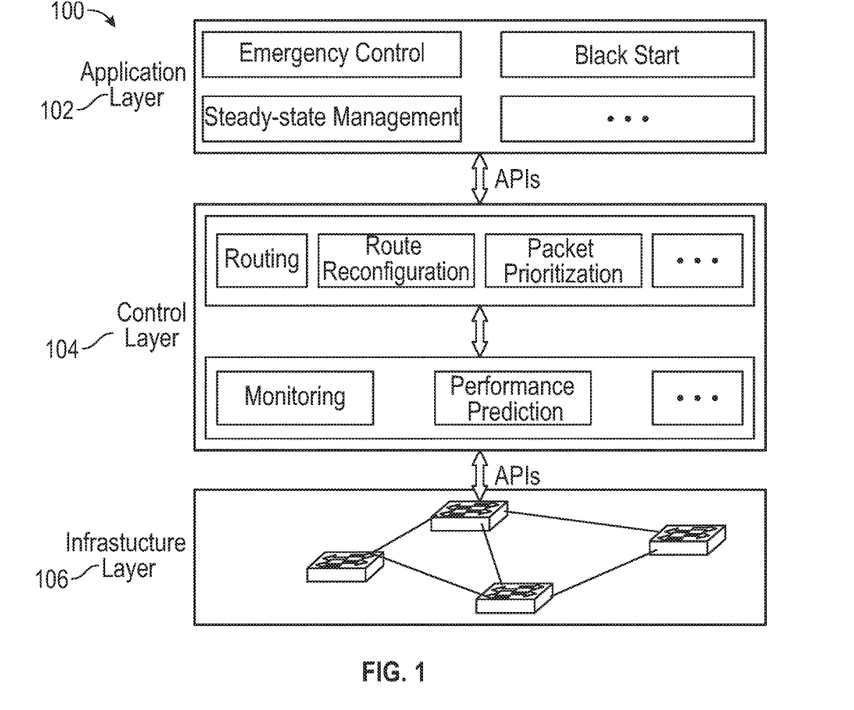
FIG. 1 illustrates an SDN-based microgrid communication architecture according to the present disclosure.

With initial reference to FIG. 1, the architecture 100 can contain three layers: the infrastructure layer 102, the control layer 104 and the application layer 106. The infrastructure layer 102 can consist of a set of SDN-capable network switches and the links (wired or wireless) connecting the switches. The control layer 104 can provide logically centralized control of the network through one SDN controller or multiple SDN controllers for scalability and reliability. The application layer 106 can implement various applications inside a microgrid central controller (MGCC), e.g., emergency control, black start, steady-state management (e.g., optimal power flow, economic dispatch).

In this architecture 100, the control plane (which decides how to handle the traffic) and data plane (which forwards traffic) of the network are separated. Specifically, the SDN switches only perform simple instructions, e.g., forwarding a packet, dropping it, sending it to the controller, or overwriting part of the packet header, according to the rules stored in their flow tables. The SDN controller exercises control of the network by pushing various control rules to the flow tables of the SDN switches through open APIs (Application Programming Interface). A widely used protocol that defines such APIs is OpenFlow.

The SDN control plane can support a wide range of functionalities. For example, it can automatically configure the network and dynamically reconfigure the network to adjust to dynamic network conditions. As an example, the SDN controller can determine the route for a flow proactively (i.e., before receiving any packet) or reactively (i.e., after receiving a packet) by solving an optimization problem based on the source, destination, the network, and the QoS requirement of the flow. It can further recalculate the route of a flow when detecting or predicting significant changes in the network, notified by the monitoring service or performance prediction service.

The run-time programmability of SDN can simplify the management of the communication network for microgrid and allows fast reaction to dynamic network conditions. As an example, standard routing protocols (Routing Information Protocol (RIP)) leads to seconds or even longer latency in reconfiguring network routes; while a SDN-based approach only incurs delay in milliseconds. As another example, the standard IP-based network provides only best-effort service, with no QoS support or latency guarantee. In SDN-based networks, QoS requirements can be met more efficiently and achieve delay guarantee, as will be described herein.

Resilient Microgrid Enabled by SDN

An SDN for microgrid can customized techniques to meet the requirements of microgrid communication. Microgrid emergency control, particularly for microgrids with high penetration of renewable energy sources, poses the most stringent requirements on the communication infrastructure. Described herein is microgrid emergency control and three SDN-based techniques for meeting the requirements of microgrid emergency control.

Microgrid Emergency Control

An emergency in the main grid can be due to many reasons, e.g., short circuit, aging failure, trouble spot caused by extreme weather event, or nuisance tripping of circuit breaker. The microgrid central controller (MGCC) can detect emergency using a monitoring and event-trigger mechanism, which can be achieved by comparing the data with a certain empirical threshold or using certain pattern recognition approaches. For example, a sudden and large drop of voltage magnitude indicates a short circuit failure nearby.

Once recognizing an emergency condition, the MGCC can send control commands to local circuit breakers and switches to create an islanding mode. In the meantime, load balancing can immediately kick in as the first step of emergency control. Based on the current load level and the available capacity of generation sources, power flows can be reallocated to achieve a new balance. This process can cause fluctuations in voltage and frequency and thus affect the power quality. The degraded power quality might not cause much disturbance to the customers when the duration of the emergency is short. However, for an emergency of longer duration, power quality control (such as frequency control) is highly needed. For emergency of even longer duration, economic operation is required to minimize losses. During different stages of emergency control, the communication network can provide global data to the MGCC to realize specific control such as synchronization, load shedding or optimal power flow.

The MGCC can reconnect the microgrid to the main grid after detecting an emergency clearance (again by comparing the data with a certain empirical threshold or using certain pattern recognition approaches) Similarly, along with time, other controllers for power quality, especially those for regulating renewable energy sources, will start functioning. The economic operation can be performed when the system reaches a new steady state. The grid reconnection process also requires highly resilient communication network.

Therefore, continuous and reliable data transmission is needed for detecting emergency condition, during emergency control, and for reconnecting a microgrid to the main grid. The communication requirements for the data used in the emergency control process vary substantially. Specifically, the control signals, while incur small amount of traffic, are of critical importance. They hence have the highest priority, and require ultra-low latency (in milliseconds). Measurements to detect emergency are also important and require low latency (in milliseconds). Other measurements data may tolerate higher latency (seconds or minutes).

SDN-Based Techniques

The following describes three SDN-enabled networking techniques. They are motivated by the need of microgrid emergency control. The first provides delay guarantee during data transmission, the second provides fast failure recovery, and the third provides rate control as a way to give different priorities to different types of data. The first two techniques requires that the underlying network has redundancy, i.e., there are multiple paths from one node to another node in the network, which is widely used in practice to provide better reliability and resilience to faults in the network.

Figure 2:
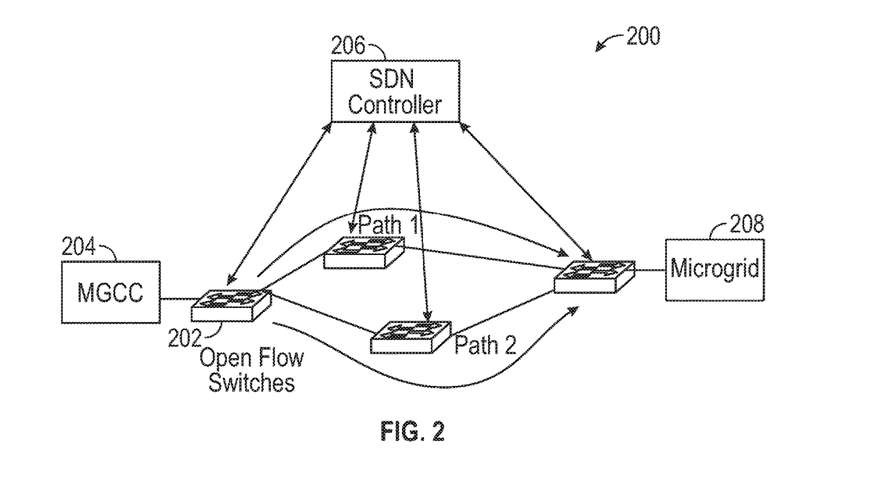
FIG. 2 illustrates an exemplary SDN-based communication network according to the present disclosure.

FIG. 2 illustrates an exemplary SDN-based communication network 200. As a non-limiting example, the SDN-based communication network 200 can contains four physical OpenFlow switches 202. The switch connected to the MGCC 204 can be a HP hardware switch (3500yl-24G) that supports OpenFlow mode. The bandwidth for each port can be 1 Gbps. The other three switches can be TP-Link 1043ND with OVS installed based on OpenWrt fireware, which is also featured with Gigabit Ethernet. The SDN controller 206 can be based on Ryu. The SDN controller 206 can communicate with the four OpenFlow switches 202 and the microgrid 208 using the OpenFlow protocol. The monitoring and control functions for microgrid data communication are realized by programming the SDN controller 206 directly. The SDN-based communication network 200 can implement the SDN-enabled network techniques as described herein.

Network Delay Guarantee

As a non-limiting example, a one data flow from a source to a destination may need to have a guaranteed delay of no more than T milliseconds. In the event, this may be the only flow that needs delay guarantee (e.g., this is a control message) and there may be k network paths from the source to the destination, k≥2. The technique described below routes the flow (identified by four tuples, source and destination addresses and source and destination port numbers) on a path that satisfies the delay requirement. It may also need to dynamically adjust the routes of other flows.

The latency of a network path can be measured. The SDN controller 206 can obtain the network latency of a path with small measurement overhead. For example, for path i, the first and last switches on the path can be $s_i$ and $s'_i$ respectively. The first-hop latency, i.e., from the source to $s_i$, and the last-hop latency, i.e., from $s'_i$ to the destination, can be negligible. In this event to obtain the network latency of path i, the SDN controller 206 can obtain the latency from $s_i$ to $s'_i$. The SDN controller 206 can create small special-purpose Ethernet frames for this purpose. Specifically, it can create three types of special-purpose Ethernet frames (marked by Ethernettype in the Ethernet frame header). The first type of Ethernet frames is used to measure the latency on the path from the SDN controller 206 to $s_i$, from $s_i$ to $s'_i$ and then back to the SDN controller 206, denoted as total latency $T_i^t$. The second type of Ethernet frames is used to measure the round trip time from the SDN controller 206 to si and then back to the SDN controller, denoted as $T_{s_i}$. The third type of Ethernet frames is used to measure the round trip time from the SDN controller 206 to $s'_i$ and then back to the SDN controller 206, denoted as $T_{s'_i}$. The forward tables of $s_i$ and $s'_i$ are set up beforehand to forward these three types of Ethernet frame accordingly to provide the corresponding measurements. In the event the latency from the SDN controller 206 to $s_i$ is similar to that from $s_i$ back to the SDN controller 206, half of $T_{s_i}$ can be used as the one-way latency from the SDN controller 206 to $s_i$. Similarly, half of $T_{s'_i}$ can used as the one-way latency from $s'_i$ to the SDN controller 206. Let $T_i$ be the latency on the ith path, i=1, . . . , k. Then $$T_i = T_i^t - \frac{T_{s_i} + T_{s'_i}}{2} \quad (1)$$

In the event the flow requires the delay guarantee is on path d, the algorithm for delay guarantee is summarized in Algorithm 1. Algorithm 1 can be executed after a specified time interval. Each time Algorithm 1 is executes, it obtains the latency on each path, and checks whether the latency of path d still satisfies the delay requirement. If the latency is above the threshold, T, then the SDN controller 206 switches the flow to another path that has latency below T, or when necessary, switches the routes of other flows that do not need delay guarantee.

---

Algorithm 1 SDN-based technique for network delay guarantee.

1: for all path i do
2:   obtain the delay of the path. T, using (1)
3: end for
4: if $T_d$ > T then
5:   if ∃d' such that $T_{d'}$ < T then
6:     switch the flow to path d'
7:   else if there are other flows on path d then
8:     divert these flows to other paths
9:   else
10:    find another path, d', that has multiple flows, move the target flow to path d' and move other flows on path d' to other paths when necessary
11:  end if
12: end if

---

Automatic Fail-Over

In the event, that there are k network paths from a source to a destination, k≥2 and when one path fails, the automatic fail-over technique diverts all flows on this path to another path. Specifically, following the OpenFlow specification, an OpenFlow switch 202 generates and sends a PortDown message to the SDN controller 206 when a port fails. Once receiving the PortDown message, the SDN controller 206 can pinpoint the location of the failure, and then reconfigure the routes for the flows that are affected by this failure. The newly calculated routes are then installed in the relevant switches to reroute the flows. One simple way to reconfigure the route for a flow is setting the route to one of the remaining k−1 routes uniformly randomly. Another approach is that the SDN controller 206 determines the route by solving an optimization problem.

Compared to standard protocols (e.g., RIP), the above algorithm provides much faster route reconfiguration. In addition, OpenFlow 1.3 specifies an optional FAST-FAILOVER group type that can be supported by a switch for automatic fail-over, which incurs even less latency because the fail-over is based on a group table that is predetermined, not involving the SDN controller 206.

Traffic Prioritization

Certain types of data flows in microgrid (e.g., control signals) may need to have rate guarantee, and need to have a higher priority than other flows. SDN can provide a diverse set of QoS support that varies from simple operations such as rate limitation to complex operations such as DiffServ. In OpenFlow v1.3, two mechanisms that can provide rate limitation are meter table and queues. A meter table includes meter entries, in which meters are directly attached to flow entries. A meter measures the rate of packets assigned to it and enables controlling the rate of those packets. Queues are configured with minimum and maximum rates. Queues are attached to switch ports, and indirectly control the rates of the flows mapped to a port. The QoS configurations for both mechanisms can be changed dynamically over time using SDN controller 206.

Hardware-in-the-Loop Environment

A hardware-in-the-loop (HIL) environment is built to explore the feasibility and effectiveness of the SDN based communication architecture for microgrid. The High-Level Design and Main Components of the HIL environment is discussed herein.

High-Level Design

Figure 3:
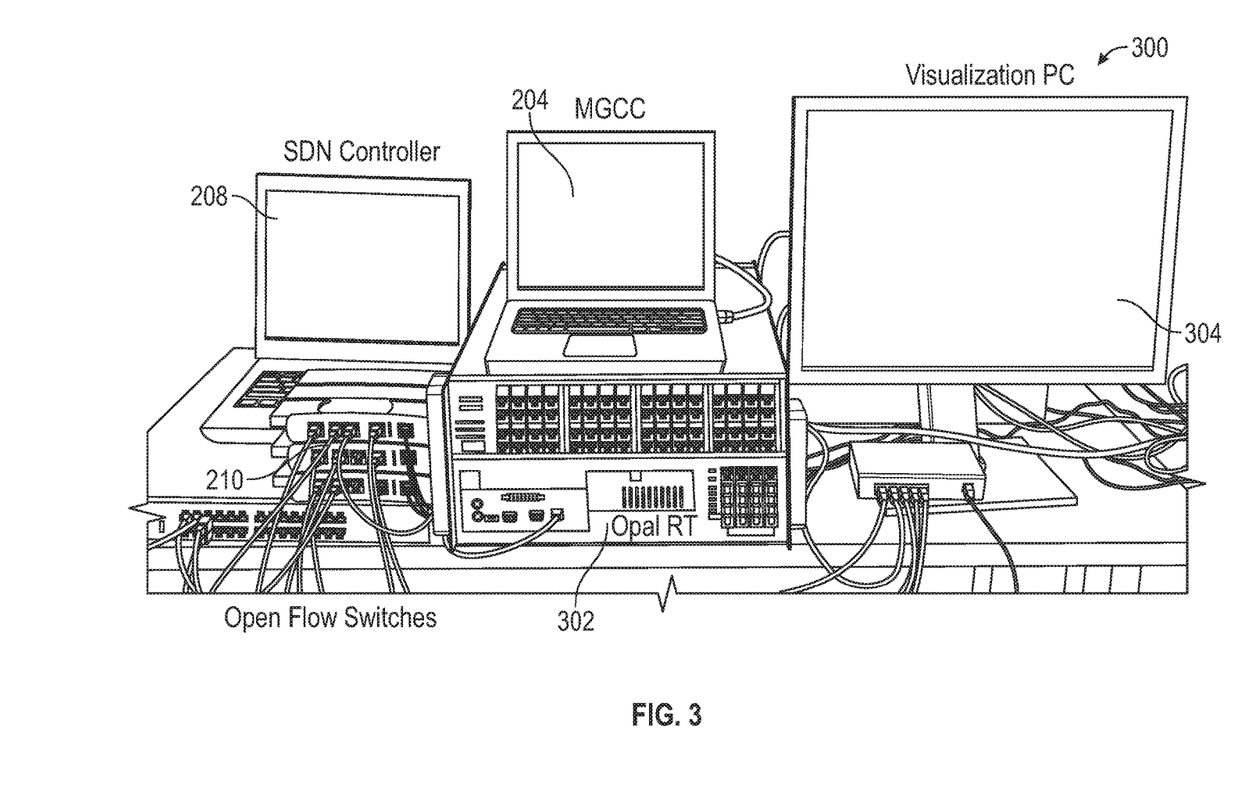
FIG. 3 illustrates a Hardware-in-the-loop (HIL) environment that uses SDN for microgrid communication according to the present disclosure.

With reference to FIG. 3, the HIL 300 is designed to provide realistic, scalable and flexible testing of SDN-based communication architecture for microgrid. Specifically, it models a microgrid based on the configurations of a microgrid. The various components (e.g., energy sources and loads) inside the microgrid are in Opal-RT ARTEMiS 302, a real-time power system simulator. The measurements from the simulator are transmitted through a communication network to the MGCC 204, which runs on a dedicated computer. The communication network (e.g SDN-based communication network 200 as shown in FIG. 2) is implemented using real SDN hardware. As a non-limiting example, it can include four OpenFlow switches 202, forming two network paths between the simulator and MGCC 204. All the OpenFlow switches 202 are supervised by a SDN controller 206 that runs on another dedicated computer. A visualization PC 304 is used to display the models and simulation curves running in a nonsynchronization mode. The system as implemented can facilitate, the two-way real-time communication between the Opal-RT microgrid testbed and MGCC 204 through the ultra-fast programmable SDN network.

SDN-Based Communication Network

The SDN-based Communication Network can be implemented as shown and described with reference to FIG. 2. The microgrid (e.g. microgrid 208 as shown in FIG. 2) can be implemented as a microgrid simulator such as a visualization PC (e.g. visualization PC 304 as shown in FIG. 3).

Microgrid Modeling and Simulation

Figure 4:
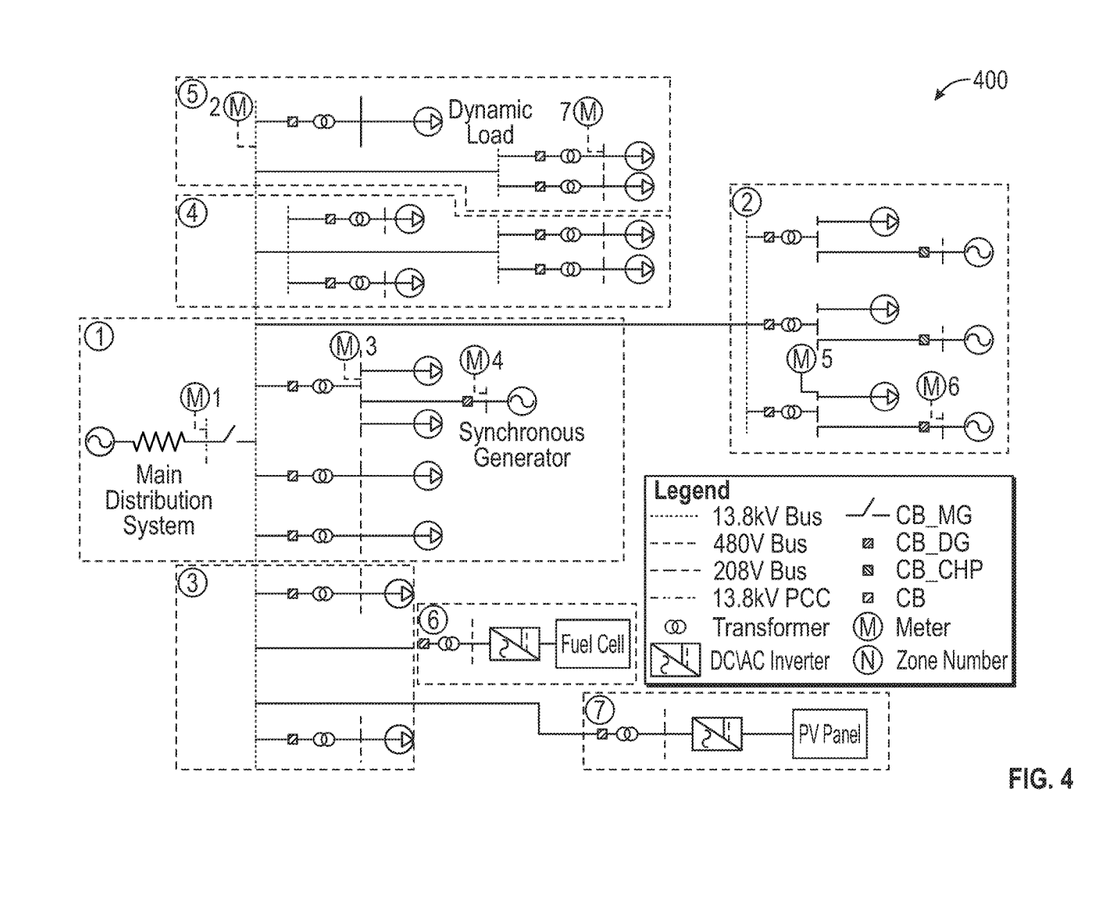
FIG. 4 is an exemplary one-line diagram of a microgrid according to the present disclosure.

This microgrid can include a 100 kW PV array, a 200 kW phosphoric acid fuel cell, four 125 kW synchronous generators (two combined heat and power (CHP) units and two diesel units) and 16 building loads. FIG. 4 illustrates the one line diagram for the simulation system 400, where the PCC (point of common coupling) joins the microgrid with the main distribution system through a circuit breaker (CB). The two diesel generators (DG) work as backup sources (only kicking in for emergency) while the other two CHP units work as base-load sources. All four units are modeled as synchronous machines with speed governors and excitation systems.

Backup Generators:

Before kicking in as backup, a diesel unit is connected with a small bypass load to gain certain angular speed and rotor angle. The frequency reference of its speed governor is slightly below the fundamental frequency (60 Hz) to prepare for synchronization to the microgrid. When a control command is sent to crank a diesel generator, the synchronization block will hold it and wait until the synchronization condition (angle difference $\Delta\delta$ is zero) is satisfied. In practice, as long as $\Delta\delta$ is below a certain value, the angular speed difference and the inertia of the main distribution system will automatically lead the diesel generator into synchronization. According to IEEE Standard 67, the phase angle difference for the synchronization of a turbine generator should be within 10 electrical degrees. Considering the low inertia of the diesel generator, in this paper, the criterion is set to be below 0.1 radian (or 5.7 electrical degrees), i.e., $\Delta\delta<0:1$. Once the generator receives control signal from the synchronization block, the bypass load is disconnected and meanwhile the generator is connected to the microgrid.

PV Array and Fuel Cell:

The 100 kW PV array is modeled by a standard signal diode equivalent circuit. It ties to the main grid through a set of power electronic devices. First, the PV output voltage is boosted by a DC/DC converter with a duty ratio of 0.275. Then the DC power goes through a DC/AC converter driven by a pulse width modulation signal from a Voltage Sourced Converter (VSC) controller (which contains an outer proportional integral (PI) loop for DC voltage regulation and an inner PI loop for current regulation). Let $K_p$ and $K_i$ denote respectively the coefficients for the proportional and integral terms of a PI controller. Their values for the PI controllers are listed in Table I.

The fuel cell has a capacity of 400 kW. In present model, the fuel cell can generate 200 kW active power to match with the local load for islanding purpose. The electrical process of the fuel cell is considered. The output voltage of the fuel cell is a combination of the Nernst potential, the activation loss, the Ohmic loss, and the concentration loss. The power electronic interface of the fuel cell has the same structure as that of the PV array but with different PI parameters (shown in Table I).

TABLE 1

PI PARAMETERS OF VSC CONTROLLERS FOR PV AND FUEL CELL.

| | $K_p$ | $K_i$ |
|---|---|---|
| DC Voltage Regulator of PV Interface | 7 | 800 |
| Current Regulator of PV Interface | 0.3 | 20 |
| DC Voltage Regulator of fuel cell Interface | 7 | 37 |
| Current Regulator of fuel cell Interface | 0.2 | 7 |

Parallel Simulation:

As shown in FIG. 4, the microgrid is divided into seven subsystems (marked by the dashed rectangles) for parallel simulation in Opal-RT. The subsystems are connected via a Stubline block (a technique used in Opal-RT) so that the state space of the whole system can be separated into subspaces and each of them occupies a single physical core built in the simulator. In addition, a control block is built to collect measurements and send out control signals. A console block is developed for system setting and system scoping. In system setting, the fault information is predefined and the irradiance for PV panel is described. Those setting information can be altered through human-machine interfaces on-the-fly, if necessary. The system scoping includes functions to observe different measurements for monitoring and analysis purposes.

Microgrid Emergency Control Strategy

The HIL environment can utilize a basic emergency control strategy as described herein. A more advanced control strategy is left as future work. In the control strategy, the remedial actions are to connect the backup diesel units and stabilize the microgrid. Let $V_{pcc}$ represent the voltage magnitude of the PCC bus, and $\Delta\delta_i$ denotes the voltage angle difference of the two buses between the circuit breaker of the ith diesel generator, i=1, 2. The circuit breaker of the microgrid (denoted as CB MG in FIG. 4) is controlled by the local relay devices. The first-level control signal $C_1$ generated by the MGCC directly operates CB_MG (in islanding case it works as a backup signal of relay devices) and serves as an input of the synchronization block. The second-level control signal $C_{2i}$ is the control signal from the synchronization block of the ith backup diesel unit. Initially, $C_1$ is set to be 1 (close) and $C_{2i}$ is set to be 0 (open). The control strategy is described as follows.

Step 1: Measurements from selected buses (e.g., Vpcc, $\Delta\delta_1$ and $\Delta\delta_2$) are transmitted to the MGCC through the SDN network using TCP/IP protocol.

Step 2: MGCC identifies fault from measurements. For instance, if $V_{pcc}$ drops below a threshold voltage (e.g., 0.3 p.u.), it is determined to be a short circuit and the first-level control signal $C_1$ is flipped to 0; otherwise, the main grid is in steady state (or after a temporary fault is cleared) and $C_1$ is set to be 1.

Step 3: $C_1$ is used as a control signal of CB MG: 1 is to switch on the circuit breaker and 0 is to switch it off. In most islanding cases, the CB MG is switched off by relay devices since they respond faster than the MGCC. Also, $C_1$ is an input of the synchronization block.

Step 4: In the synchronization block, only when $C_1$=0 and the corresponding, $\Delta\delta_i$ is less than 0.1 radian, the second-level control signal $C_{2i}$ is set to be 1; otherwise $C_{2i}$ is 0.

Step 5: Similar to step 3, $C_{2i}$ is used to control the circuit breaker for the ith backup diesel unit. The circuit breaker of the bypass load is controlled by the complement of $C_2$ (i.e., $1-C_{2i}$). As a result, the ith backup diesel unit is either connected to the microgrid or to the bypass load As non-limiting example, the effectiveness of the emergency control on the HIL environment and the contributions to resilient microgrid operations of the three SDN-based techniques on the HIL-environment, can be demonstrated. In the non-limiting example, a three phase fault can be applied at the PCC bus at t=22 s, which triggers islanding of the microgrid. The fault is then cleared and the main grid recloser restores power at t=28 s, which leads to the re-connection of the microgrid. The HIL simulator uses a time step of 30 μs and the microgrid data (voltage magnitude measured from Meter 1 and Meter 7) is sent out to the MGCC every 300 μs.

Emergency Control with SDN

Figure 5A:
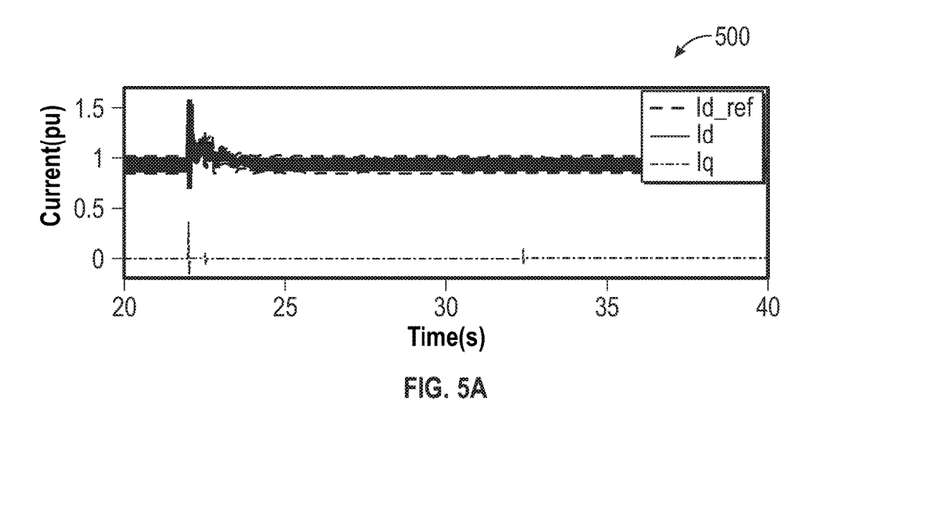
FIG. 5A illustrates Current Regulator Dynamics in PV VSC control and FIG. 5B illustrates Voltage magnitudes at PCC bus and microgrid according to the present disclosure.
Figure 5B:
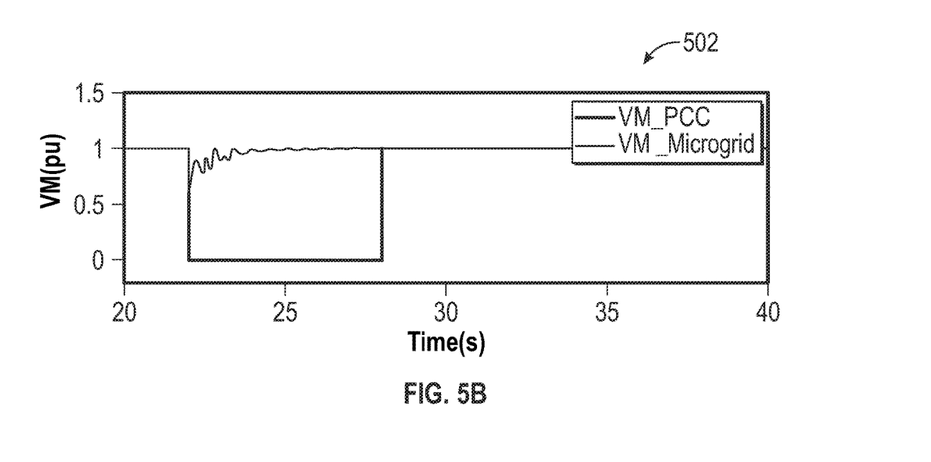

Continuing with the non-limiting example, the microgrid dynamics between [20 s; 40 s] can be selectively illustrated in FIGS. 5A-5B. FIG. 5A shows a graphical representation 500 of the dynamics of the current regulator inside the VSC controller of the PV array. When islanding starts, there is a voltage drop in microgrid due to the load unbalancing. To maintain the voltage level, the voltage regulator increases the reference of the d axis current (Id ref) and, after a new balancing is achieved, the reference restores to 1. The AC current response of the PV array is shown by d axis current (I_d) and q axis current (I_q).

FIG. 5B illustrates a plot 502 of the voltage magnitude of phase A measured from Meter 1 and Meter 3 (as shown in FIG. 4). It can be observed that even though the PCC voltage drops to zero during the grid fault between 22 s and 28 s, the voltage in microgrid quickly bounces back and is fully stabilized within 3 seconds without unacceptable swell or dip. This indicates that the emergency control strategy is effective in maintaining microgrid resilience during and after contingency. In this non-limiting example, the arriving times of the relay signal, $C_1$, $C_{21}$ and $C_{22}$ are 22 s, 22:013 s, 22:514 s and 22:558 s, respectively. When the fault occurs, relay devices directly trigger the CB_MG to isolate the microgrid from the main distribution system. Then, the MGCC detects grid abnormality and sends out the control signal $C_1$ and it takes a round trip time in the communication network for $C_1$ to arrive at the synchronization block and initiate the synchronization processes for DG1 and DG2. Later, once the synchronization conditions are satisfied, the final control signals $C_{21}$ and $C_{22}$ are sent out to the local CBs to switch in the diesel units. It can be observed from FIGS. 5A-B that:

The regular MGCC control signal delay (without network contingency and link failure) is 13 ms including round trip traveling time between simulator and the MGCC and the data processing time of the MGCC.

It takes around 500 ms for the backup DGs to satisfy synchronization conditions, which leads to a relatively large delay on microgrid load balancing.

The sooner the islanded microgrid receives control signals $C_{21}$ and $C_{22}$, the smoother the voltage profile and the better stability performance the microgrid achieve during islanding process.

Network Delay Guarantee

The network delay guarantee technique can provide network delay guarantee effectively. Continuing with the non-limiting example discussed above, network congestion can be modeled by adding a 500 ms delay can be added to path1 (e.g., path1 as shown in FIG. 2) at 20 s, slightly before the main grid failure.

Figure 6:
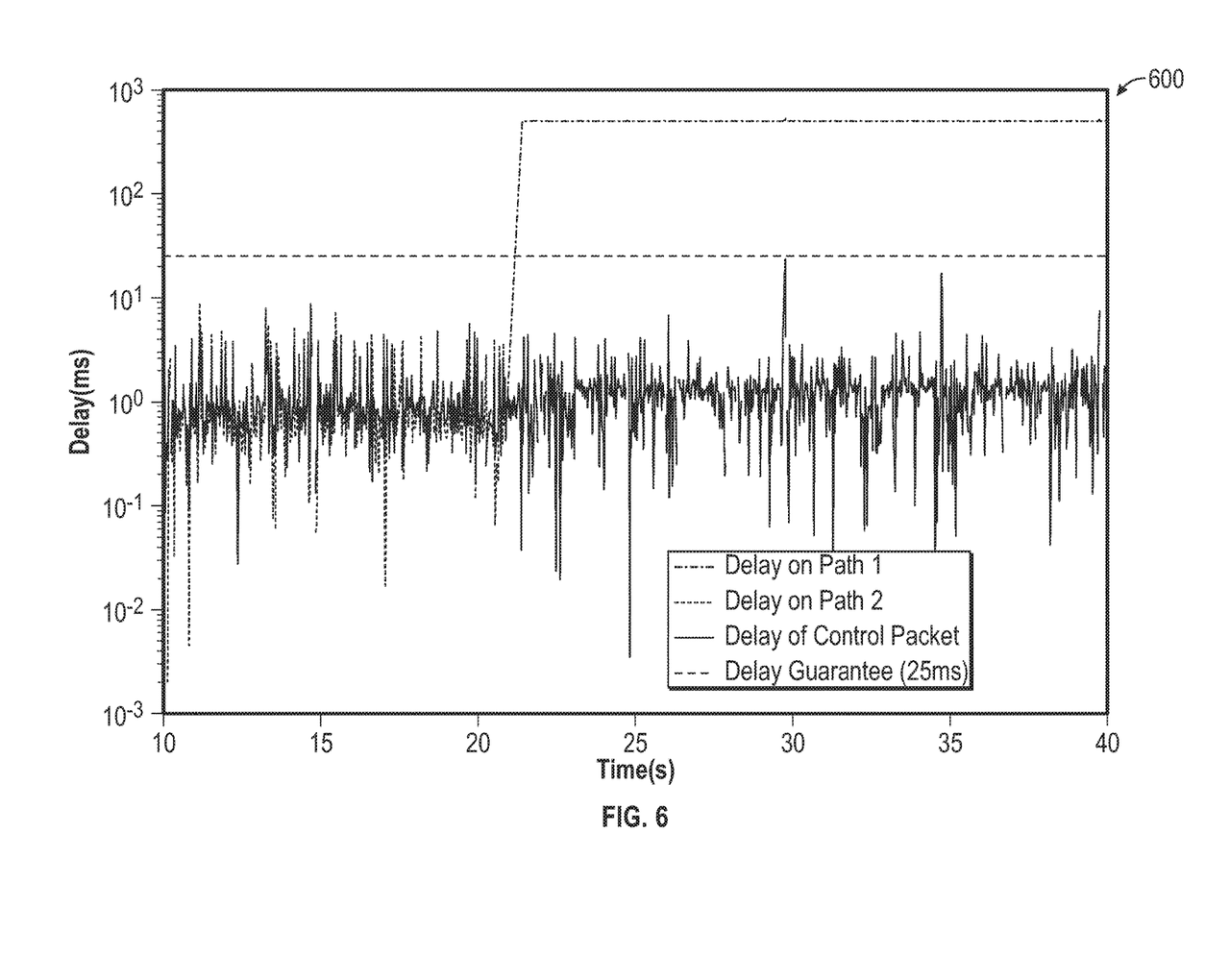
FIG. 6 shows the effects of diverting traffic to achieve network delay guarantee according to the present disclosure.

FIG. 6, illustrates a chart 600 of the delay over time. As shown in FIG. 6, the delay experienced by control packets can be larger than the threshold (set to be 25 ms), the SDN controller (e.g., SDN controller 206 as shown in FIG. 2) can check the delay on another path (e.g., path2 as shown in FIG. 2). For this case, the latency of path2 satisfies the latency requirement for control packets. The SDN controller therefore changes the flow tables to route the control packets to path2 so that the time delay requirements of the control packets are guaranteed.

Figure 7A:
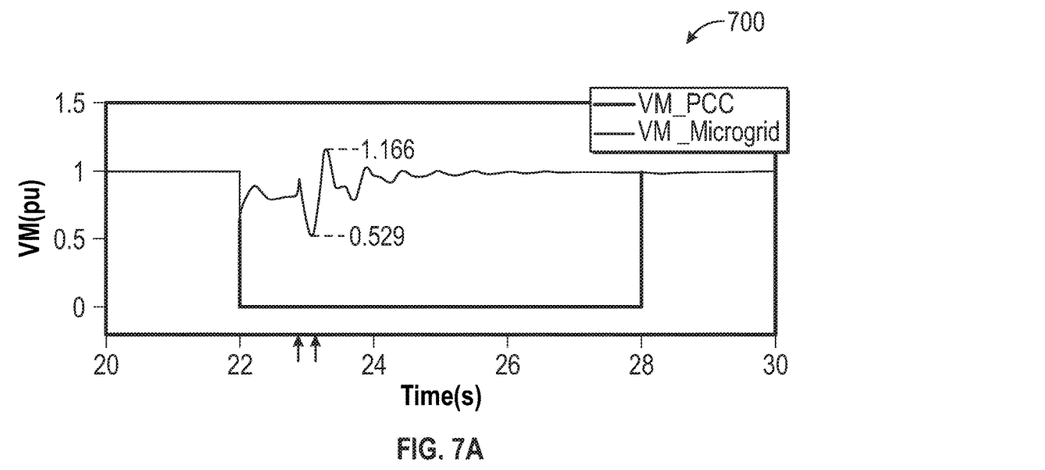
FIG. 7A illustrates system response without time delay guarantee and FIG. 7B illustrates system response with time delay guarantee.
Figure 7B:
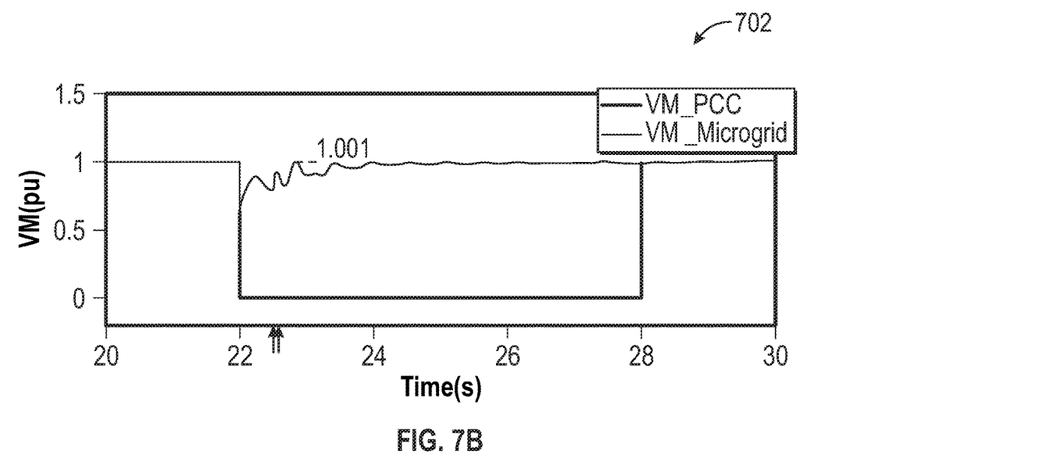

FIG. 7A illustrates a chart 700 showing a system response time without time delay guarantee and FIG. 7B illustrates a chart 702 showing a system response time with the time delay guarantee. FIGS. 7A-7B show that, with SDN control, a 21.57 cycles delay is eliminated in the control loop. Such improvement significantly benefits microgrid resilience, enabling shorter transient period and thus less voltage fluctuations in microgrid. The mean value of time delay in path2 (e.g. path2 as shown in FIG. 2) is 1.281 ms and the standard deviation is 1.519 ms. The network latency measured by the SDN controller has random variances partly caused by measurement error and partly caused by the network itself. The variances can be below the threshold of 25 ms. The SDN controller (e.g. SDN controller 206 as shown in FIG. 2) keeps measuring the network latency every 5 ms. Thus, the time delay guarantee function takes a maximum of 10 ms to detect that the latency is larger than the threshold and switches path for the control packets, which is far below the threshold of 25 ms. When network congestion occurs, without time delay guarantee, the maximum voltage magnitude of the microgrid can be up to 1.166 p.u. and the lowest voltage can be 0.522 p.u., which is not acceptable in real-world power grid operation.

Failover Recovery

Continuing with the non-limiting example discussed above, the voltage magnitude of a remote bus measured by Meter 7 (as shown in FIG. 3) can be recorded twice: one at the local meter and another at the MGCC (e.g., MGCC 204 as shown in FIG. 2). The latter lags behind the former by a traveling time in the communication network. At 23 s, one of the cable connecting two ports in the HP switch (3500yl-24G) fails (e.g., unplugged).

Figure 8:
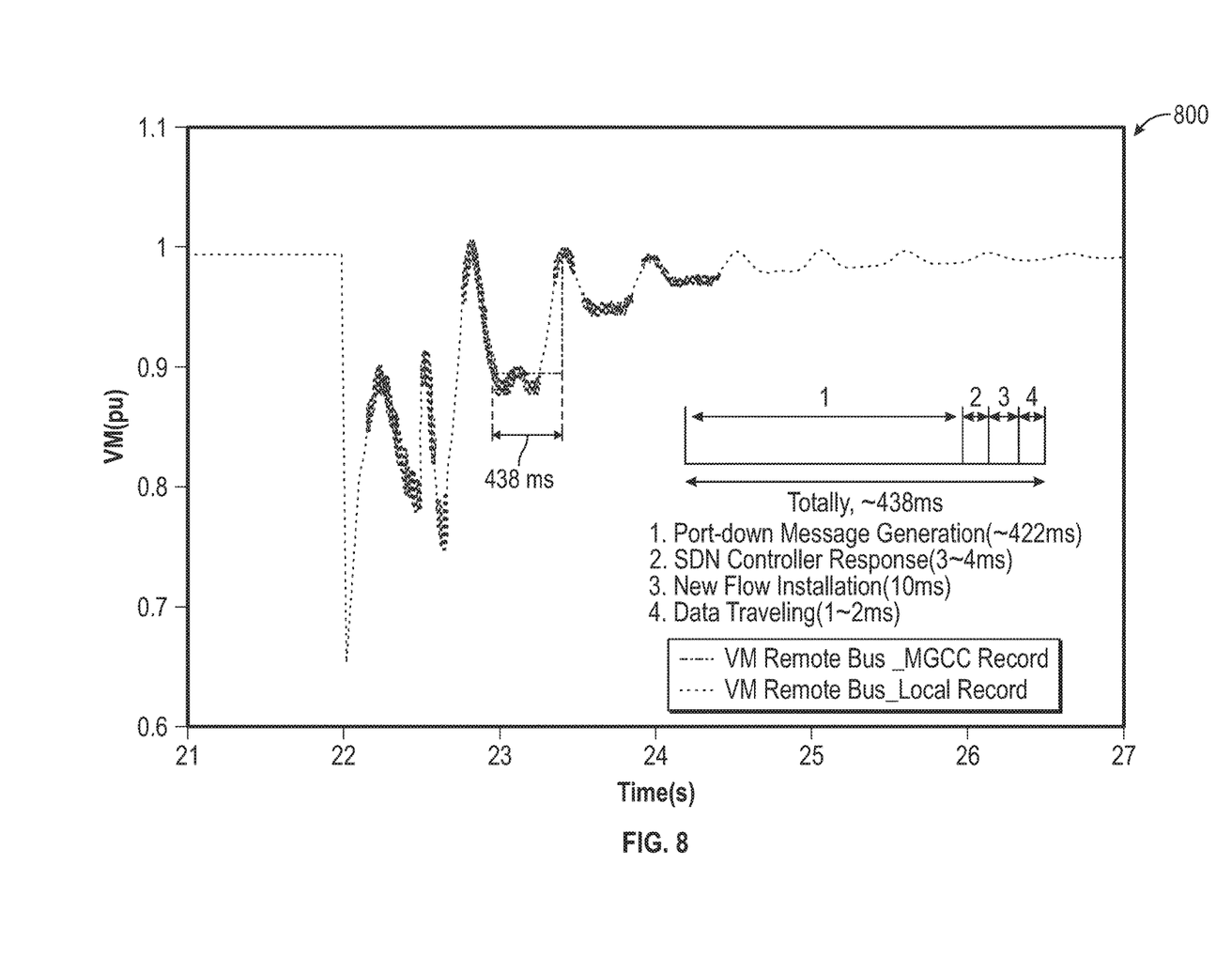
FIG. 8 shows various delays during fail-over recovery (reconfiguration after link down) according to the present disclosure.

FIG. 8 illustrates a chart 800 showing the signal transmission performance during link down. Initially, there are some packet losses around 23 s in MGCC records because of network failure. The SDN controller (e.g., SDN controller 206 as shown in FIG. 2) then reconfigures the network and the route is recovered within 0:438 s. This latency is significantly lower than that caused by standard protocols (such as RIP), which is a few seconds or minutes or even longer. The failover recovery can maintain continuous data transmission. Maintaining continuous data transmission can be implemented in the event communication network links and power transmission lines fail simultaneously.

The time to perform the fail-over function can be within a range of [437 ms, 445 ms] in this non-limiting example. This time consists of four parts: SDN controller data processing time (3~4 ms), new flow table installation time (10 ms), data transmission time (1~2 ms), and the port-down message generation time (~422 ms). Therefore, the dominant part of the delay is for the port-down message generation. This delay may be reduced with the fast development of Openflow switches, leading to even faster fail-over recovery.

Packet Prioritization

Continuing with the non-limiting example discussed above, different bandwidths for two flows with different limiting rates can be set at an OpenFlow switch (e.g., OpenFlow switches 202 as shown in FIG. 2) by meter tables. The first flow (redundant measurements) has a low rate limitation of 200 kbps while the other flow (critical measurements) has a higher rate limitation of 50 Mbps.

Figure 9:
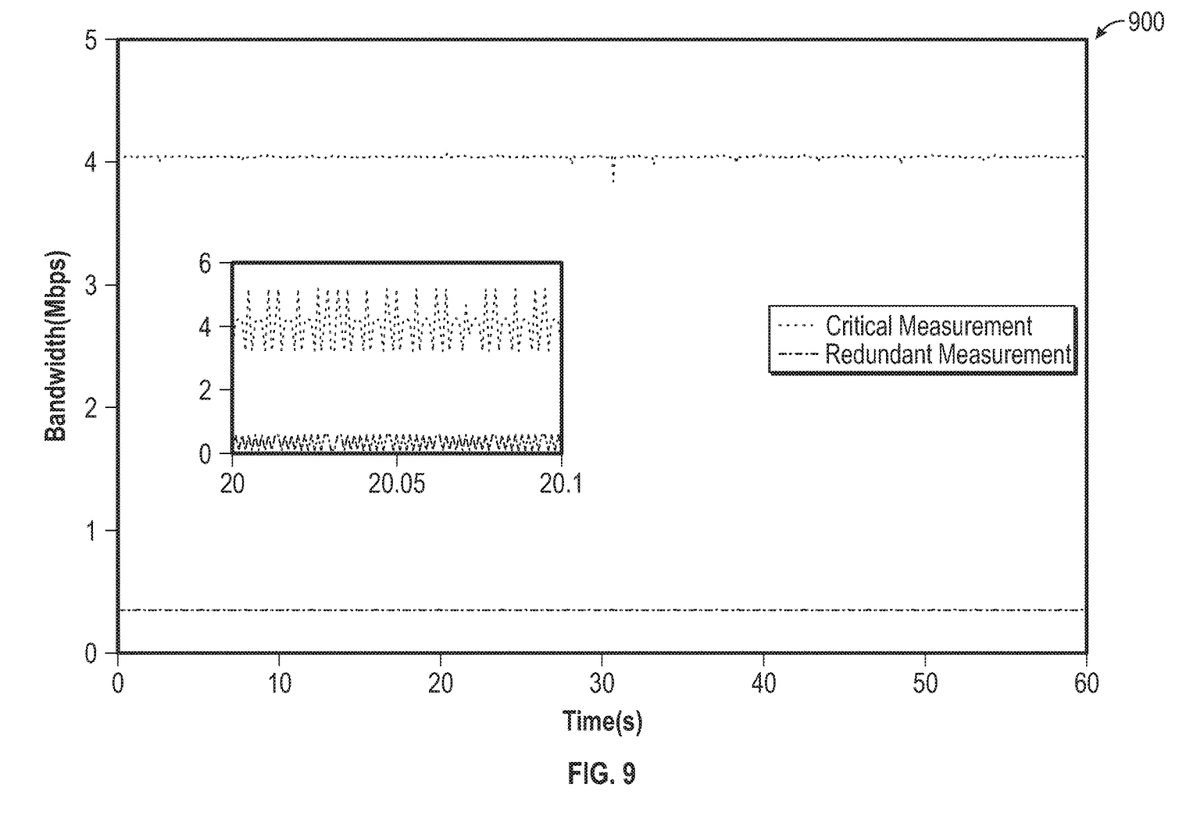
FIG. 9 shows rate limit for two different flows in microgrids (Redundant measurements from Meter 7 and critical measurements form Meter 1) according to the present disclosure.

FIG. 9 illustrates a chart 900 showing rate limit for two different flows in microgrids (redundant measurements from Meter 7 and critical measurements form Meter 1). The bandwidth for the critical measurements is approximately 4 Mbps, while the bandwidth for the redundant measurements is much lower. The bandwidths are differentiated in this way to ensure an guaranteed bandwidth for important signals. The rate limit for the low priority flow is realized by dropping packets during certain intervals. In other words, some packets of the low priority flow may be dropped to ensure the bandwidth guarantee for the high priority flow.

Figure 10:
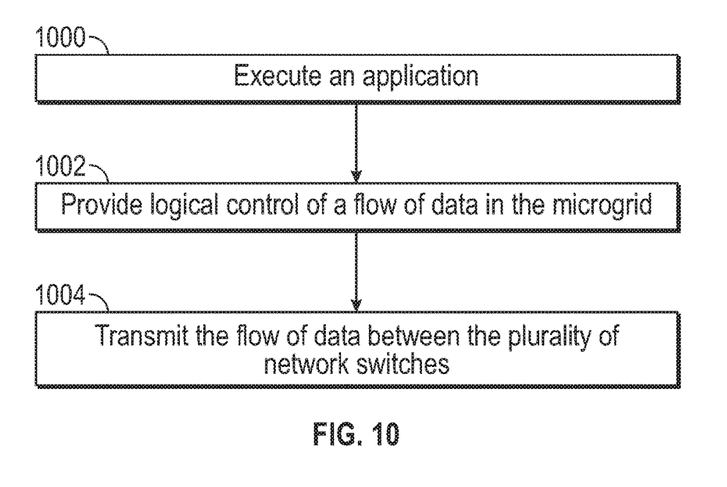
FIG. 10 illustrates a process for enabling communication in a highly-resilient microgrid using an ultra-fast programmable networking technology.

FIG. 10 illustrates a process for enabling communication in a highly-resilient microgrid using an ultra-fast programmable networking technology. In operation 1000, the an application layer communicatively coupled with a control layer can execute an application. The at least one application is programmed to manage microgrid emergency control. In operation 1002, the control layer communicatively coupled with an infrastructure layer, can provide logical control of a flow of data in the microgrid based upon the execution of the at least one application configured to manage microgrid emergency control. In operation 1004, the infrastructure layer including a plurality of network switches and a plurality of links connecting the network switches can transmit the flow of data between the plurality of network switches. The application manages microgrid emergency control by controlling the flow of data by one or more of: dynamically routing the flow of data on a path between a source and a destination, dynamically diverting the flow of data from a first path to a second path, and using a plurality of meters and a plurality of queues.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

We claim:

1. A system to enable communication in a microgrid that distributes electrical load, the system comprising:
    an application layer communicatively coupled with a control layer, configured to execute at least one of a plurality of applications, wherein the at least one application is programmed to manage microgrid emergency control,
    wherein the control layer is communicatively coupled with an infrastructure layer, and is configured to provide logical control of a flow of data in the microgrid upon the execution of the at least one application programmed to manage microgrid emergency control,
    wherein the infrastructure layer includes a plurality of network switches and a plurality of links connecting the plurality of network switches, and is configured to transmit the flow of data in between the plurality of network switches, and
    wherein, in response to detection of an emergency condition associated with the microgrid, the at least one application exercises microgrid emergency control to maintain balance between electrical load and electrical generation by controlling the flow of data by:
        (i) dynamically routing the flow of data on a path between a source and a destination to ensure the flow of data reaches the destination within a predetermined time,
        (ii) dynamically diverting the flow of data from a first path to a second path as needed to ensure the flow of data reaches the destination within a predetermined time, and
        (iii) dynamically routing the flow of data to a plurality of meters and a plurality of queues based on target rates of delivery for data packets associated with the flow of data.

2. The system in claim 1, wherein the ultra-fast programmable network technology is Software Defined Networking (SDN).

3. The system in claim 2, wherein the control layer communicates with the infrastructure using an Application Program Interface (API).

4. The system in claim 2, wherein the application layer communicates with the control layer using an API.

5. The system in claim 2, wherein the flow of data includes a plurality of data packets.

6. The system in claim 5, wherein the flow of data reaches the destination on a delay less than or equal to a specified amount of time.

7. The system in claim 5, wherein at least one meter of the plurality of meters is assigned at least one of the plurality of data packets and is configured to measure and control the rate of the at least one of the data packets and push the at least one of the data packets into at least one queue based on the rate of the at least one of the data packets.

8. The system in claim 1, wherein the at least one application is further configured to determine a location in the microgrid associated with the emergency condition.

9. The system of claim 1, wherein the emergency condition is one of a short circuit, trouble spot caused by a weather event, or nuisance tripping of a circuit breaker.

10. A method to enable communication in a microgrid that distributes electrical load, the method comprising:
- executing, via an application layer communicatively coupled with a control layer, at least one of a plurality of applications, wherein the at least one application is programmed to manage microgrid emergency control;
- providing, via a control layer communicatively coupled with an infrastructure layer, logical control of a flow of data in the microgrid based upon the execution of the at least one application configured to manage microgrid emergency control;
- transmitting, via the infrastructure layer including a plurality of network switches and a plurality of links connecting the network switches, the flow of data between the plurality of network switches,
- detecting, via the at least one application, an emergency condition associated with the microgrid;
- wherein, in response to the detected emergency condition, the at least one application exercises microgrid emergency control to maintain balance between electrical load and electrical generation by controlling the flow of data by:
  - (i) dynamically routing the flow of data on a path between a source and a destination to ensure the flow of data reaches the destination within a predetermined time,
  - (ii) dynamically diverting the flow of data from a first path to a second path as needed to ensure the flow of data reaches the destination within a predetermined time, and
  - (iii) dynamically routing the flow of data to a plurality of meters and a plurality of queues based on target rates of delivery for data packets associated with the flow of data.

11. The method in claim 10, wherein the ultra-fast programmable network technology is Software Defined Networking (SDN).

12. The method in claim 11, wherein the control layer communicates with the infrastructure using an Application Program Interface (API).

13. The method in claim 11, wherein the application layer communicates with the control layer using an API.

14. The method in claim 11, wherein a flow of data includes a plurality of data packets.

15. The method in claim 14, wherein the flow of data reaches the destination on a delay less than or equal to a predetermined amount of time.

16. The method in claim 14, wherein the at least one meter of the plurality of meters is configured to measure and control the rate of the at least one of the data packets and push the at least one of the data packets into at least one queue based on the rate of the at least one of the data packets.

17. The method in claim 10, further comprising determining a location in the microgrid associated with the emergency condition.

* * * * *